United States Patent [19]
Bedouch

[11] Patent Number: 5,743,592
[45] Date of Patent: Apr. 28, 1998

[54] LEG FOR AN AIRCRAFT SEAT, A LEG ASSEMBLY INCLUDING SUCH A LEG, AND A SEAT INCLUDING SUCH A LEG ASSEMBLY

[75] Inventor: Pierre-Francois Bedouch, Issoudun, France

[73] Assignee: Societe Industrielle et Commerciale de Materiel Aeronautique, Issoudun, France

[21] Appl. No.: 655,567

[22] Filed: May 30, 1996

[30] Foreign Application Priority Data

May 31, 1995 [FR] France ...................... 95 06486

[51] Int. Cl.$^6$ ..................................... B60N 2/42
[52] U.S. Cl. ..................... 297/216.2; 297/216.1
[58] Field of Search ............... 297/216.2, 216.19, 297/216.16, 216.1, 452.18; 248/188.8; 244/122.2, 118.6

[56] References Cited

U.S. PATENT DOCUMENTS

| 4,440,441 | 4/1984 | Marrujo et al. | |
|---|---|---|---|
| 4,861,103 | 8/1989 | Vallee | 297/216.2 |
| 4,911,381 | 3/1990 | Cannon et al. | 297/216.2 X |
| 5,069,505 | 12/1991 | Amthor et al. | 297/216.2 |
| 5,152,578 | 10/1992 | Kiguchi | |
| 5,499,783 | 3/1996 | Marechal | 297/216.2 X |

FOREIGN PATENT DOCUMENTS

| 2 684 955 | 6/1993 | France . |
| 31 47 045 | 5/1983 | Germany . |

*Primary Examiner*—Milton Nelson, Jr.
*Attorney, Agent, or Firm*—Young & Thompson

[57] ABSTRACT

A leg for the leg assembly of an aircraft seat presents over at least a portion of its length, at least one segment whose cross-section has at least a portion that is generally U-shaped defined by a web extending in a transverse direction and two flanges extending in a longitudinal direction, the opening of the U-shape facing in a longitudinal direction, said segment serving to contribute to absorbing energy.

37 Claims, 3 Drawing Sheets

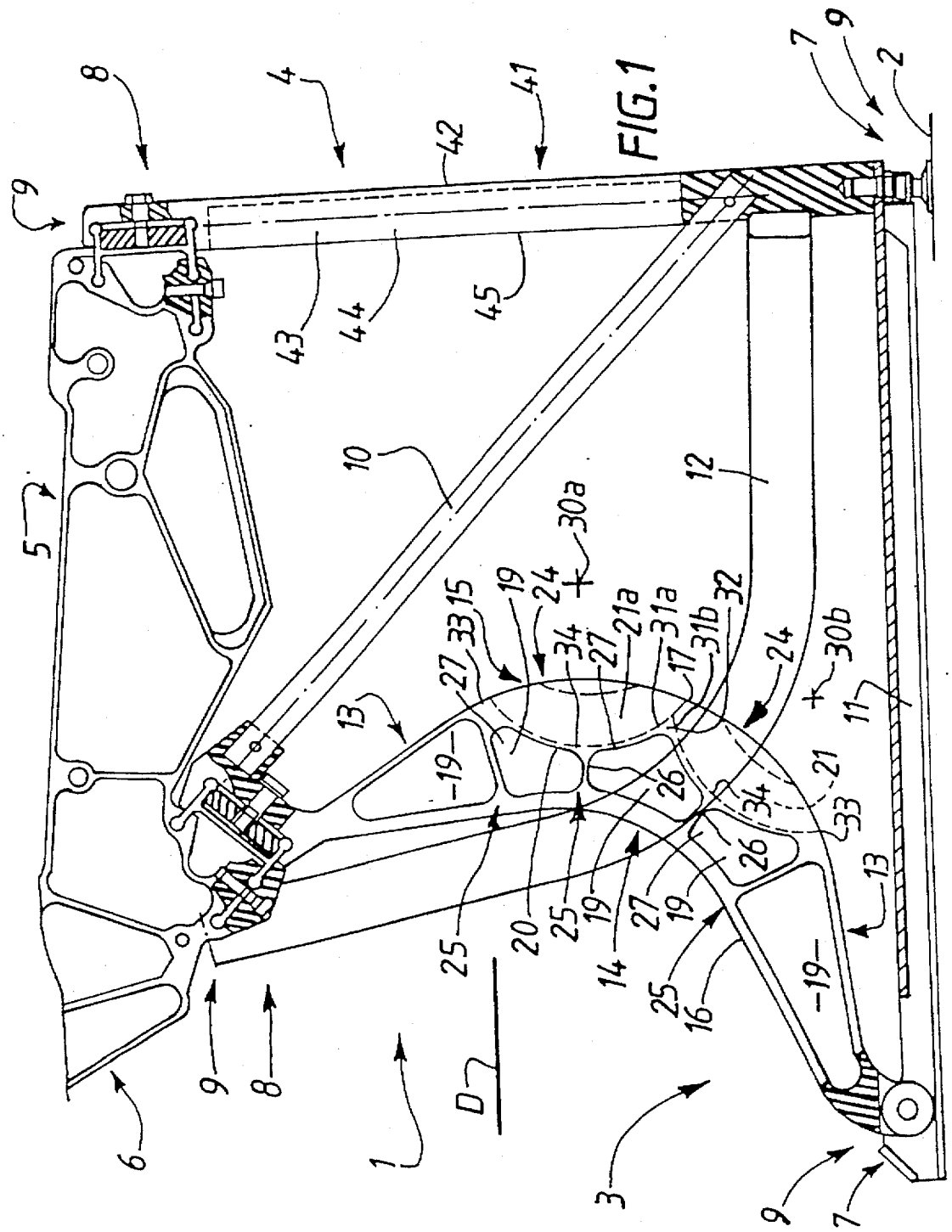

LEG FOR AN AIRCRAFT SEAT, A LEG ASSEMBLY INCLUDING SUCH A LEG, AND A SEAT INCLUDING SUCH A LEG ASSEMBLY

The invention relates to a leg for an aircraft seat, to a leg assembly including such a leg, and also to an aircraft seat including such a leg assembly.

BACKGROUND OF THE INVENTION

Leg assemblies for aircraft seats are already known that include energy-absorbing elements.

In document U.S. Pat. No. 2,959,207, the back leg is telescopic.

In other embodiments, provision is made for an energy-absorbing element to be interposed between the back leg and the front leg. In document EP-A-0 496 658, the element is interposed between the top of the back leg and the bottom of the front leg. In documents EP-A-0 053 012 and EP-A-0 286 471, the energy-absorbing element is associated with the middle of the back leg.

Finally, in document U.S. Pat. No. 5,152,578, the energy-absorbing element is interposed between the bottom of the back leg and the top of the front leg.

Also, according to document GB-A-2 232 584, an aircraft seat leg assembly is described in which the back leg is generally banana-shaped in elevation. In right cross-section the leg is generally U-shaped over nearly all of its length. The web of the U-shape is situated in the longitudinal plane of the seat going from front to back. The flanges of the U-shape are thus disposed transversely relative to the seat, and the opening of the U-shape likewise faces laterally towards one side of the seat.

OBJECTS AND SUMMARY OF THE INVENTION

The invention seeks to solve the problem of energy absorption without having recourse to adding on specific energy-absorption means.

In addition, energy absorption is achieved in the same direction as the forces.

To this end, in a first aspect, the invention provides a leg for an aircraft seat which presents, over at least a portion of its length, at least one segment of cross-section that is at least in part generally U-shaped being defined by a web extending in a transverse direction and two flanges extending in a longitudinal direction, the opening of the U-shape having a longitudinal direction, said segment of or including a U-shape having the function of contributing to energy absorption.

In a first variant embodiment, the segment is generally U-shaped. In a second embodiment, the segment is both generally U-shaped and generally I-shaped in combination, the web of the U-shape and a first flange of the I-shape being common.

The segment of or including a U-shape occupies at least the middle zone of the leg, and in particular it is confined to said zone.

In another embodiment, the segment of or including a U-shape extends over a substantial portion of the length of the leg. Nevertheless, this segment does not occupy the two free end portions of the leg.

The segment of or including a U-shape is situated in a zone of the leg in which energy stresses resulting from a crash can be absorbed.

In a first possible embodiment corresponding to a back leg of the leg assembly of an aircraft seat, the leg is generally curved in shape including two terminal zones tapering towards two free ends where there are leg association means, and between which there is an enlarged middle zone having a segment that includes a U-shape.

The opening of the U-shape is situated on the outside of the curve of the leg.

The segment may either be a single portion that is both U-shaped and I-shaped in combination, or else it may comprise a plurality of combined U-shaped and I-shaped portions extending lengthwise with one or more U-shaped portions extending therebetween and forming ribs, with the insides of the U-shapes of all the portions optionally communicating with one another.

The segment including a U-shape occupies an angular extent that is about half that of the leg.

For example, if the angular extent of a leg is about 180°, then the segment including a U-shape has an angular extent lying in the range 65° to 90°, more particularly in the range 75° to 85°, and particularly about 80°.

The web of the U-shape is arcuate, with its concave side directed towards the outside of the curve of the leg.

The web of the U-shape may comprise a single arc or it may comprise a plurality of arcs.

The junction between two arcs also defines a U-shape. The junction includes an edge or is curved with the convex side facing towards the inside of the curve of the leg.

Towards both ends of the segments including a U-shape, the web of the U-shape runs into the outside of the curve of the leg.

At least one of the flanges of the U-shape, and in particular both of the flanges thereof, includes a setback, in particular in its inside face, co-operating with the outside of the curve of the leg to define a lune of smaller thickness than the remainder of the flange. The setback extends substantially parallel to the web of the U-shape in which it is to be found.

A similar setback may be found in the junction region between two arcs. It also defines a lune of smaller thickness than the remainder of the flange. This setback is to be found in each of the flanges, in the outer faces thereof.

The combined U- and I-shaped portions have a web of the U-shape combined with a first flange of the I-shape that is of substantially constant thickness, and a second flange of the I-shape that is of substantially constant thickness forming the inside of the curve of the leg.

Consequently, the length of the web of the I-shape varies, having a large value facing the ends of the arcuate web of the U-shape and a value that is small facing the center of said web.

A rib formed by a U-shaped portion is situated facing the ends of the arcuate web of the U-shape and/or facing the center of said web.

In a second possible embodiment corresponding to a front leg of the leg assembly of an aircraft seat, the leg is generally rectilinear in shape having two end zones including leg association means, and between which there is a segment constituted by a U-shape.

In a second aspect, the invention provides an aircraft seat leg assembly including one or more back legs and one or more front legs as defined above.

Such a leg assembly may also include a rigid brace interconnecting two opposite end portions of the back leg and of the front leg, such as the top end portion of the back leg and the bottom end portion of the front leg.

The leg assembly may also include a tie member interconnecting the bottom end portions of the front leg and of the back leg.

Such a leg assembly does not include a specific additional energy absorber such as a piston-and-cylinder device.

Finally, in a third and last aspect, the invention provides an aircraft seat including a leg assembly as described above.

The leg of the invention includes localized buckling means (U-shaped section) suitable for enabling energy to be absorbed, particularly in compression.

In the plastic range, the leg can operate both in traction and in compression between its two ends.

The length of the neutral axis of the leg is longer than the length of the straight line between the two ends of the leg. The presence of localized U-section zones for buckling makes it possible to align the neutral axis when force is applied. Forces are thus absorbed because of the localized and symmetrical buckling of the leg. As mentioned above, the buckling is localized. The leg designed in accordance with the invention can operate in traction. However it can also operate in compression and in bending. In the event of buckling, the flanges of the U-shape move outwardly to opposite sides of the leg, under all circumstances.

BRIEF DESCRIPTION OF THE DRAWINGS

The invention will be better understood from the following description given with reference to the accompanying drawings, in which:

FIG. 1 is a diagrammatic elevation view of an aircraft seat leg assembly seen from the side and including a front leg and a back leg, the back leg constituting a first embodiment of the invention;

MORE DETAILED DESCRIPTION

Figure 3:
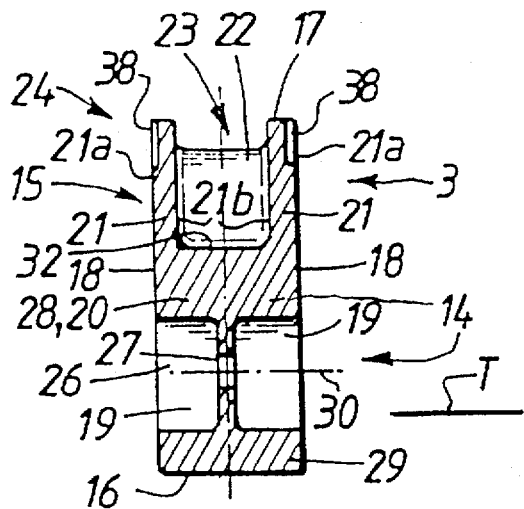
FIGS. 3 and 4 are two diagrammatic section views in right cross-section through the FIG. 2 back leg, respectively on lines III—III and IV—IV.

An aircraft seat includes a leg assembly 1 for securing to a floor 2 in an aircraft.

The leg assembly 1 comprises one or more back legs 3, one or more front legs 4, and at the top ends thereof a structural element 5 for the seat proper which is rigidly associated therewith near the back and near the front, and which is extended by a structural element 6 for the seat back.

For greater convenience, the description below refers to the leg assembly 1 in its normal position of use where it is secured to the floor 2 which is itself disposed horizontally.

Each back and front leg 3, 4 extends over a certain length between a bottom free end 7 and a top free end 8, with means 9 being provided at each of said ends for associating the leg with the floor 2 or with the element 5 for the seat proper.

In the embodiment shown in FIG. 1, the leg assembly 1 also comprises a rigid brace 10 interconnecting the two opposite end portions of the back leg 3 and the front leg 4. More particularly, the brace 10 slopes downwards from back to front so as to connect the top end 8 of the back leg 3 to the bottom end 7 of the front leg 4.

The leg assembly 1 also includes a tie member 11 interconnecting the bottom end portions 7 of the back and front legs 3 and 4. The tie member 11 is intended to be placed immediately above the floor 2.

FIG. 1 also shows a curved section member 12 forming a baggage template.

The leg assembly 1 does not have any specific energy absorbers added thereto such as piston-and-cylinder devices, since the legs and in particular the back leg 3 are specifically designed to absorb energy in the event of a crash.

The back leg 3 is described more specifically below.

The back leg 3 is generally curved, being banana-shaped, and in the example shown it extends over an angle of about 180°. The generally curved shape of the leg 3 is associated with the way in which it operates. The leg 3 is designed to operate in the plastic range both in traction and in compression between its two ends.

The back leg 3 thus has two terminal zones 13 extending and tapering towards the ends 7 and 8, and between the two terminal zones 13 it has an enlarged middle zone 14 in which there is a segment 15 including a U-shape.

Because of its curved shape, the back leg 3 defines an inside 16 and an outside 17 of its curve. In the leg assembly 1, the inside 16 of the curve faces backwards while the outside 17 of the curve faces forwards, towards the front leg 4 of the same leg assembly.

The terminal zones 13 and the middle zone 14 respectively taper and flare between the inside 16 and the outside 14 of the curve in the plane of FIG. 1.

To clarify the description, a direction situated in the plane of FIG. 1 and extending substantially parallel to the floor 2 is referred to as the longitudinal direction D. The longitudinal direction D thus defines a back end and a front end.

A transverse direction T is defined as being a direction extending perpendicularly to FIG. 1. The transverse direction T corresponds to the width of the seat including the leg assembly 1.

In the transverse direction T, the back leg 3 is of substantially constant width between its two ends 7 and 8.

The back leg 3 is thus defined longitudinally by two large faces 18.

Where appropriate, the large faces 18 may include recesses or depressions 19 in the terminal zones 13 to reduce the weight of the leg.

In the embodiment under consideration, the segment 15 including a U-shape is thus located in the middle zone 14 and in that zone only, with the two terminal zones 13 having no such segment.

The U-shaped right cross-section defines a web 20 and two flanges 21.

The web 20 extends in the transverse direction T. The two flanges 21 are spaced apart and they face each other.

The flanges co-operate with the web 20 to define an inside space 22, and remote from the web 20 they define an opening 23. The opening 23 extends in the transverse direction and it faces (normal to the opening) in the longitudinal direction D, and in the example under consideration, it faces towards the outside 17 of the curve.

Each flange 21 has an outer face 21a and an inner face 21b.

The outer face 21a faces towards the outside of the leg 3 while the inner face 21b faces the space 22 and the opposite flange 21.

Figure 2:
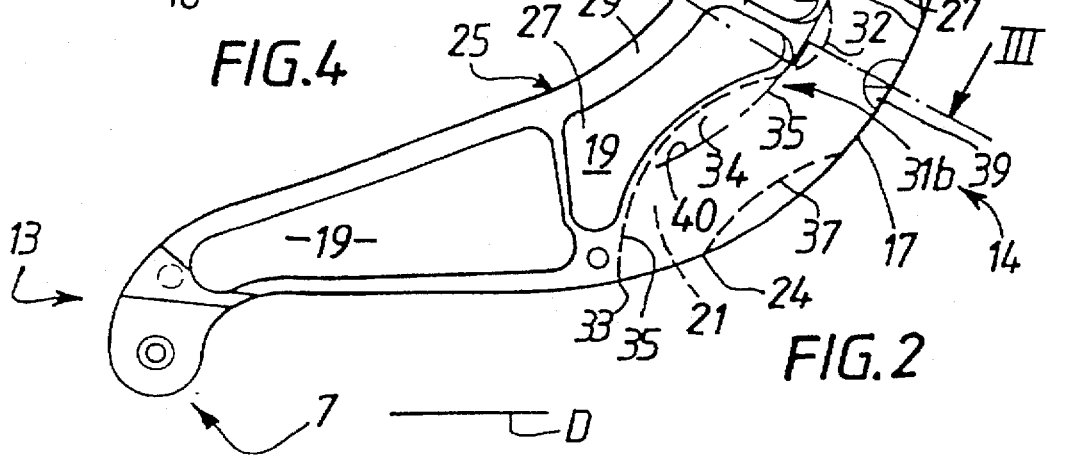
FIG. 2 is a diagrammatic side elevation view of a second embodiment of the back leg.

In the embodiments shown in FIGS. 1 and 2, the segment 15 includes a plurality of U-shaped and I-shaped portions 24 that are combined together with one or more interposed U-shaped portions 25 each forming a rib 26.

The portions 24 extend lengthwise, whereas the portion(s) 25 is/are of small lengthwise extent. The term "length" is used herein to mean distances measured along the back leg 3 between its ends 7 and 8.

The subdivision of the segment 15 into a plurality of portions such as 24 and 25 is to facilitate description, it being understood that the inside spaces 22 of the U-shapes in all of said portions are in communication with one another in continuous manner.

In a variant, the segment 15 includes a single combined U- and I-shaped portion.

The general shape of the I-shaped portion is itself defined by a web 27, a first flange 28, and a second flange 29.

The web 27 extends longitudinally and parallel to the flanges 21. More precisely, it is situated in an intermediate midplane between the two midplanes of the two flanges 21. Each of the two flanges 28 and 29 extends transversely as does the web 20 of the U-shape.

In addition, the web 20 of the U-shape and the first flange 28 of the I-shape are common, i.e. they coincide.

As a result, the U-shape and the I-shape are placed back-to-back. It should be understood at this point that this configuration comprises a single piece and that there is no genuine physical separation between the U and the I shapes, with references to a U-shape and to an I-shape being given merely to facilitate explanation.

In the embodiment of FIG. 1, two ribs 26 are provided whereas in the embodiment of FIG. 2, there is only one rib 26.

The web 20 of the U-shape is arcuate about an axis 30 extending in the transverse direction.

The concave side of the web 20 faces generally into the internal space 22 and towards the outside 17 of the curve of the leg.

In the embodiments of FIGS. 1 and 2, the web 20 comprises two arcs both having their concave sides facing towards the outside 17 of the curve of the leg.

Nevertheless, the ambit of the invention also covers the case where the web 20 comprises a single arc or where it comprises more than two.

It will be observed that the upper arc 31a in the embodiment of FIG. 1 has its own axis 30a located substantially halfway between the seat element 5 and the tie member 11. In the longitudinal direction, the axis 30a is situated about one-fourth of the distance from the outside 17 of the curve of the back leg 3 in the middle zone 14 thereof and the front leg 4.

The axis 30b of a lower arc 31b is situated substantially vertically below the outside face 17 in the middle zone 14, and in the vicinity of the tie member 11.

Between two arcs such as 31a and 31b, there is a junction 32 which also has a U-shaped right cross-section.

In the embodiment of FIG. 1, the junction 32 includes an edge formed by the intersection of the two arcs 31a and 31b.

In the embodiment of FIG. 2, the junction 32 is curved and its convex side faces towards the inside 16 of the curve of the leg.

Towards these two connection ends with the terminal zones 13, the segment 15 has the web 20 meeting the outside 17 of the curve of the leg at edges 33.

An arc 31a, 31b of web 20 serves to define a central portion 34 and two ends 35.

The web 20 is further from the outside 17 of the curve of the leg in the central portion 34. It is then closer to the inside 16 of the curve. Conversely, the web 20 is closer to the outside 17 in the ends 35 and, in said locations, it is further from the inside 16 of the curve.

In the central portion 34, the web 20 is situated substantially halfway between the inside 16 and the outside 17 of the curve of the leg.

In the embodiment of FIG. 1, the two ribs 26 face the central portion 34 in a direction on which the axis 30a, 30b is to be found.

In the embodiment of FIG. 2, the single rib 26 is situated at the two adjacent ends 35 of the two arcs 31a, 31b defining the junction 32. The axis defining the curved shape of this junction 32 is then situated on the direction of said rib 26.

We now consider the thicknesses of the component portions of the back leg 3 in its middle zone 14.

The term "thickness" is used herein to mean distance measured in a direction perpendicular to the direction in which the portion under consideration extends.

Thus, for the web 20 and the flanges 28 and 29, the thickness extends in a direction lying in the plane of FIGS. 1 and 2 and in particular in a longitudinal direction D. For the flanges 21 and the web 27, thickness is measured in the transverse direction T.

For the web 20 combined with the first flange 28, the portions 24 and 25 are of substantially constant thickness along the segment 15. Similarly, the flanges 21 are of substantially constant thickness along the segment 15 as is the second flange 29.

Figure 4:
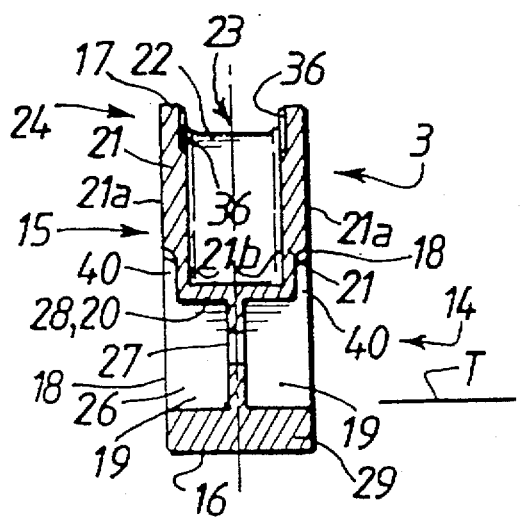

In the typical embodiment of FIG. 4, in a combined U- and I-shaped portion 24, the web 20 has a thickness that is of comparable order to that of the flanges 21. For example, the web 20 may be about half the thickness of the flanges 21. Similarly, the web 27 has a thickness that is equal to or close to that of the web 20.

The second flange 29 may be several times thicker than the web 27.

In the embodiments shown in FIGS. 1 and 2, setbacks are provided in the flanges 21 to define zones of reduced thickness.

A first setback 36 on the inner face 21b of each flange 21 extends substantially parallel to the web 20 of the U-shape where it is located and co-operates with the outside 17 of the curve of the leg to define a first lune 37 of smaller thickness than the remainder of the flange 21.

In the embodiment of FIG. 2, provision is made for a second setback 38 (FIG. 3) on the outer face 21a of each flange 21 in the junction zone 32 so as to cooperate with the outside 17 of the curve of the leg to define a second lune 39 of smaller thickness than the remainder of the flange.

In the example of FIG. 2, provision is also made for a third setback 40 (FIG. 4) in the outer face 21a of each flange 21 situated at an intermediate location between the inside 16 and the outside 17 of the curve of the leg and extending substantially parallel thereto so as to overlie the web 20.

The length of the web 27 of the I-shape measured in the same direction as the plane of FIGS. 1 and 2, normal to the inside 16 and to the outside 17 and along which said web extends is variable. Its greatest value faces the ends 35 and its smallest value faces the central portion 34.

In elevation, the web 27 and the flanges 28 and 29 of the I-shape define an outline that is more or less in the form of a distorted curvilinear polygon.

In the embodiment of FIG. 1, there are two curvilinear trapezium-shaped outlines placed towards the ends of the segment 15 and a pentagonal-shaped outline placed between the other two.

In the embodiment of FIG. 2, two outlines are provided of curvilinear polygonal shape.

Such a back leg 3 can be deformed, in the event of necessity, either forwards or backwards.

The front leg 4 is now described in greater detail with reference to FIGS. 1 and 5.

Unlike the back leg 3 which is curved in shape, the front leg 4 is generally rectilinear in shape. Apart from its two ends 7 and 8, the leg is in the form of a segment 41 constituted by a U-shape defined by a web 42 and two flanges 43.

Together they define an inside space 44 and an opening 45.

In the front leg 4 when installed in the leg assembly 1, the web 42 extends between the two ends 7 and 8 of the leg and also in the transverse direction.

Figure 5:
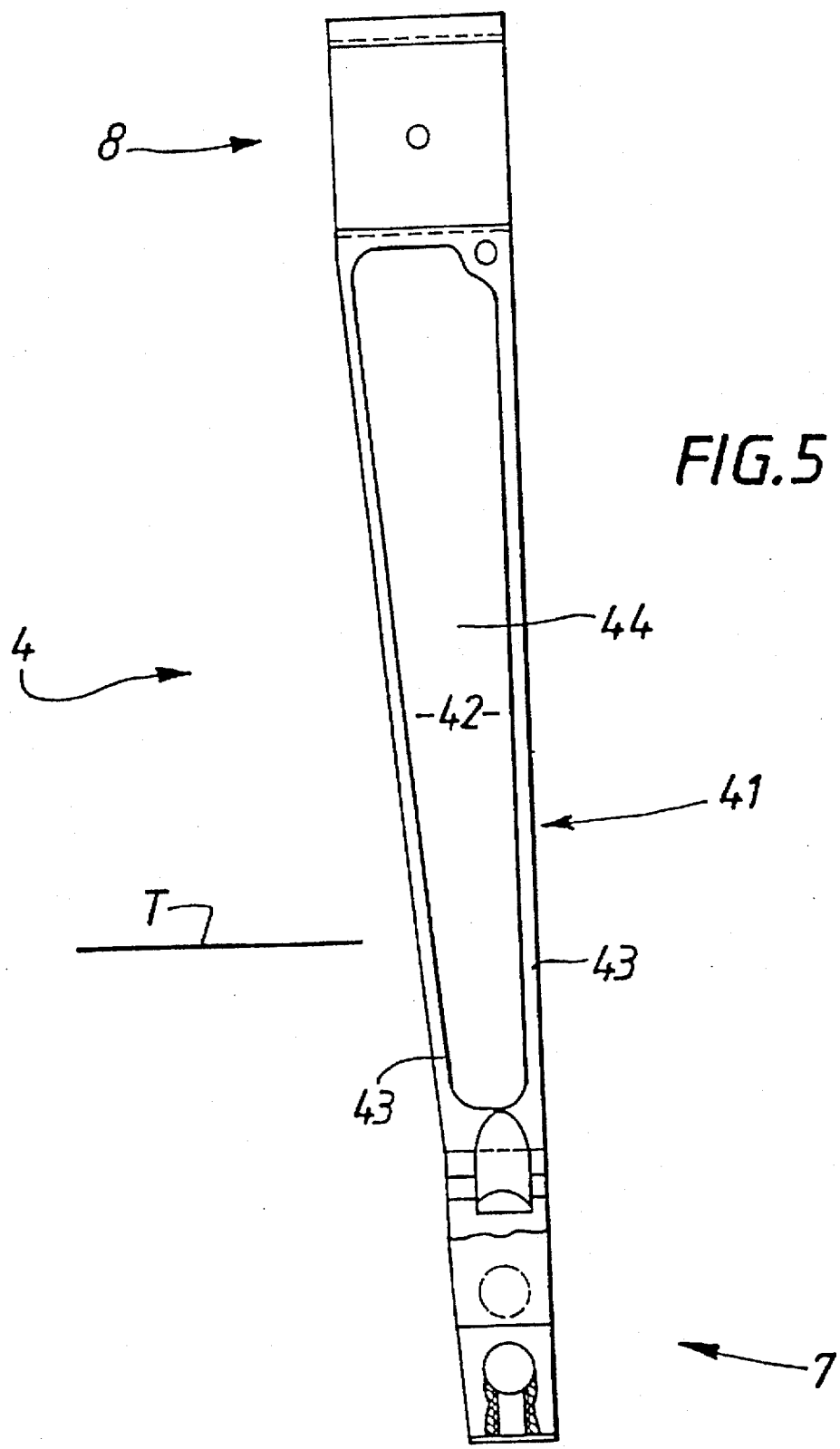
FIG. 5 is a front elevation view of the front leg.

The flanges 43 extend in the longitudinal direction parallel to the plane of FIGS. 1 and 5.

The web 42 is located at the front and the opening 45 of the U-shape faces towards the back leg 3. It will be observed that because of this situation, the hollow shape of the front leg 4 is practically invisible to a user sitting on the seat that includes the leg assembly 1.

The web 42 and the flanges 43 are of substantially constant thickness between the two ends 7 and 8. The same applies to the width of the flanges 43 measured in the longitudinal direction D.

As can be seen clearly in FIG. 5, the two flanges 43 splay apart from each other going from the bottom free end 7 towards the top free end 8. Consequently, the width of the web 42 measured in the transverse direction T has a minimum value near the bottom free end 7 and a maximum value near the top free end 8, with the value of said width varying substantially regularly along the leg 4 between the two ends 7 and 8.

Both for the front leg 4 and for the back leg 3, the angular extent of the segments 41 and 15 respectively is organized to be about one-half that of the corresponding legs 3 or 4.

For legs 3 and 4 having an angular extent of about 180°, the corresponding segments 41 and 15 have an angular extent lying in the range 65° to 95°, more specifically 75° to 85°, and in particular about 80°.

I claim:

1. A leg for an aircraft seat comprising over at least a portion of its length at least one segment for absorbing energy by buckling, in cross-section said segment comprising a U-shape defined by a web extending in a transverse direction and two flanges extending in a longitudinal direction, and an I-shape defined by a center portion and two end portions, wherein said web of said U-shape is common with one of said two end portions of said I-shape.

2. A leg according to claim 1, wherein the segment extends over a substantial fraction of the length of the leg.

3. A leg according to claim 1, wherein the segment does not extend to ends of the leg.

4. A leg according to claim 1, wherein the segment is situated in a zone of the leg where energy stresses can be absorbed.

5. A leg according to claim 1, wherein the segment is situated away from portions of the leg where the leg is associated with structural elements of the seat and with the floor to which it is anchored.

6. A leg according to claim 1, wherein the segment occupies at least a middle zone of the leg.

7. A leg according to claim 6, wherein the segment is restricted to said middle zone.

8. A leg according to claim 1, wherein it is generally curved in shape, having two terminal zones tapering towards ends of the leg, and having between said terminal zones an enlarged middle zone comprising said segment.

9. A leg according to claim 8, wherein the U-shape opens towards an outside of the curve of the leg.

10. A leg according to claim 8 wherein the segment comprises a single portion having the combined U- and I-shape.

11. A leg according to claim 8, wherein the segment includes a plurality of the combined U-shaped and I-shaped portions extending lengthwise, with at least one rib-forming U-shaped portion interposed therebetween, wherein internal spaces of all of the U-shaped portions are in communication with one another.

12. A leg according to claim 8, wherein the segment has an angular extent of about half that of the leg.

13. A leg according to claim 8, wherein a portion of the combined U and I shapes has a first said flange of substantially constant thickness, and a second said flange of substantially constant thickness forming the inside of the curve of the leg.

14. A leg according to claim 8, wherein the width of the center portion of the I-shape is variable, the width being larger adjacent ends of the web than at a central portion of said web.

15. A leg according to claim 8, further comprising a rib facing one of an end and a central portion of said web.

16. A leg according to claim 8, constituting a back leg of the aircraft seat.

17. A leg according to claim 8, wherein at least one flange includes a setback co-operating with the outside of the curve of the leg to define a tune of smaller thickness than a remainder of the at least one flange.

18. A leg according to claim 17, wherein each said flange includes a setback in its inner face extending substantially parallel to the web of the U-shape.

19. A leg according to claim 8, wherein the segment has an angular extent in the range 65° to 95°, with the angular extent of the leg being about 180°.

20. A leg according to claim 19, wherein the angular extent of the segment is in the range 75° to 85°.

21. A leg according to claim 20, wherein the angular extent of the segment is about 80°.

22. A leg according to claim 8, wherein the web of the U-shape is arcuate, with its concave side facing towards the outside of the curve of the leg.

23. A leg according to claim 22, wherein the web comprises a single arc.

24. A leg according to claim 22, wherein the web meets the outside of the curve of the leg at ends of the segment.

25. A leg according to claim 22, wherein the web comprises a plurality of arcs.

26. A leg according to claim 25, wherein a junction between two of the arcs defines a U-shape.

27. A leg according to claim 26, wherein the junction between the two arcs is curved, with its convex side facing towards the inside of the curve of the leg.

28. A leg according to claim 25, wherein, at a junction zone between two of the arcs at least one flange includes a setback co-operating with the outside of the curve of the leg to define a lune of smaller thickness than a remainder of the at least one flange.

29. A leg according to claim 28, wherein each said flange includes a setback in its outside face.

30. A leg assembly for an aircraft seat, including at least one back leg according to claim 1 and at least one front leg.

31. An aircraft seat including a leg assembly according to claim 30.

32. A leg assembly according to claim 30, wherein each of the front legs is generally rectilinear in shape, having two ends with leg association means, and a-U-shaped part extending between them.

33. A leg assembly according to claim 32, wherein the U-shaped part has a web which has a minimum width towards one end, and a maximum width towards the opposite end, said width varying in substantially regular manner between said maximum and minimum widths.

34. A leg assembly according to claim 30, also including a rigid brace interconnecting two opposite extreme portions of one of the back legs and a corresponding one of the front legs.

35. A leg assembly according to claim 34, wherein the brace interconnects a top end of the one back leg and a bottom end of the one front leg.

36. A leg assembly according to claim 34, also including a tie member interconnecting a bottom end of one of the back legs and a bottom end of a corresponding one of the front legs.

37. A leg assembly according to claim 34, wherein it does not include an added special energy absorber.

* * * * *